US012300935B2

(12) United States Patent
Vachon

(10) Patent No.: US 12,300,935 B2
(45) Date of Patent: May 13, 2025

(54) FOOL-PROOFING DEVICE, ELECTRICAL CONNECTION ASSEMBLY COMPRISING SAID IMPROVED FOOL-PROOFING DEVICE AND ASSOCIATED ASSEMBLY METHOD

(71) Applicant: LATELEC, Toulouse (FR)

(72) Inventor: Guillaume Vachon, Toulouse (FR)

(73) Assignee: Latelec, Labege (FR)

( * ) Notice: Subject to any disclaimer, the term of this patent is extended or adjusted under 35 U.S.C. 154(b) by 390 days.

(21) Appl. No.: 17/996,390

(22) PCT Filed: Apr. 15, 2021

(86) PCT No.: PCT/EP2021/059837
§ 371 (c)(1),
(2) Date: Oct. 17, 2022

(87) PCT Pub. No.: WO2021/213897
PCT Pub. Date: Oct. 28, 2021

(65) Prior Publication Data

US 2023/0216247 A1 Jul. 6, 2023

(30) Foreign Application Priority Data

Apr. 20, 2020 (FR) .................................. FR2003934

(51) Int. Cl.
*H01R 13/645* (2006.01)
*H01R 13/627* (2006.01)
(Continued)

(52) U.S. Cl.
CPC ..... *H01R 13/6453* (2013.01); *H01R 13/6275* (2013.01); *H01R 13/745* (2013.01); *H01R 43/26* (2013.01); *H01R 2201/26* (2013.01)

(58) Field of Classification Search
CPC ............ H01R 13/6453; H01R 13/6275; H01R 13/745; H01R 43/26; H01R 2201/26
(Continued)

(56) References Cited

U.S. PATENT DOCUMENTS 4,173,387 A * 11/1979 Zell ........................ H01R 13/44 439/655
6,394,856 B1 5/2002 Wertz
(Continued)

FOREIGN PATENT DOCUMENTS

EP 1437802 7/2004
EP 1732180 12/2006
(Continued)

*Primary Examiner* — Gary F Paumen
(74) *Attorney, Agent, or Firm* — Defillo & Associates, Inc; Evelyn A. Defillo

(57) ABSTRACT

An improved poka-yoke device for an electrical connection assembly having a first part (3) and a second part (4) which can be removably coupled via a mechanical link along a main axis (X). The first part (3) having a first poka-yoke member (31) and the second part (4) having a second poka-yoke member (41). The first part (3) having interlocking securing devices for interlockingly securing the first connector (1) to the panel (P) that accommodates it. The second part (4) having first interlocking fixing device that are arranged so as to fix the second part (4) to the second connector (2), The first part (3) and the second part (4) each having second complementary mechanical fixing devices that are intended to interact with one another by interlocking when the first connector (1) and the second connector (2) are coupled.

13 Claims, 4 Drawing Sheets

(51) Int. Cl.
*H01R 13/74* (2006.01)
*H01R 43/26* (2006.01)

(58) Field of Classification Search
USPC .......................................................... 439/894
See application file for complete search history.

(56) References Cited

U.S. PATENT DOCUMENTS

| | | | | |
|---|---|---|---|---|
| 7,326,090 | B2 * | 2/2008 | Cayzac .............. | H01R 13/6453 439/378 |
| 9,246,273 | B2 * | 1/2016 | Montet .............. | H01R 13/6277 |
| 2013/0280950 | A1 * | 10/2013 | Becavin ............... | H01R 13/465 439/680 |
| 2020/0212638 | A1 * | 7/2020 | Gretz .................... | H01R 13/111 |

FOREIGN PATENT DOCUMENTS

| | | | |
|---|---|---|---|
| EP | 2787579 | 10/2014 | |
| EP | 2787579 A1 * | 10/2014 | ......... H01R 13/6277 |

* cited by examiner

FOOL-PROOFING DEVICE, ELECTRICAL CONNECTION ASSEMBLY COMPRISING SAID IMPROVED FOOL-PROOFING DEVICE AND ASSOCIATED ASSEMBLY METHOD

CROSS REFERENCE TO RELATED APPLICATION

This application is a national stage entry of PCT/EP2021/059837 filed Apr. 15, 2021, under the International Convention and claiming priority over French Patent Application No. FR2003934 filed Apr. 20, 2020.

TECHNICAL FIELD OF THE INVENTION

The invention relates to an improved fool-proofing device and to an electrical connection assembly fitted with said improved fool-proofing device.

The invention also relates to a method for mounting the improved fool-proofing device.

The solution of the invention will be in particular perfectly adapted for being associated with an electrical connection assembly utilized in an avionics bay.

PRIOR ART

Conventionally, an electrical connection assembly has a connector referred to as fixed connector and a movable connector, referred to as mating connector, which can be plugged into the fixed connector to provide the electrical connection.

It will be recalled that avionics is all of the electronic, electrical and computer equipment that assists with the piloting of aircraft and spacecraft in airspace or outer space.

As is known, an avionics bay is intended to receive electrical modules which are installed removably and are intended to manage the various functions of the aircraft. The avionics bay in particular has orientable racks or panels that support electrical connectors associated with the various modules in the bay. The fixed connector is integrated in the panel and the mating connector is intended to be inserted in the fixed connector to produce an electrical connection.

In an avionics-type bay, multiple fixed connectors are often disposed side by side on one and the same panel and it is therefore necessary to be sure that each mating connector is connected to the fixed connector associated with it.

To that end, use is made of mechanical poka-yoke solutions. The mechanical poka-yoke principle is known in the field of electrical connection for the purpose of ensuring that two connectors are compatible and are connected together properly. As a general rule, this involves two elements which are positioned, on the one hand, on the fixed connector and, on the other hand, on the mating connector and which can be mechanically coupled only when the following two conditions are met:

The mating connector chosen is indeed that which is associated with the fixed connector, The mating connector is moved toward the fixed connector in the correct orientation.

If the mating connector is not that intended to be connected to the fixed connector, or if it is moved toward the fixed connector in an incorrect orientation, the poka-yoke device is responsible for preventing the two connectors from being connected. The poka-yoke device thus makes it possible to secure the electrical connection between two compatible connectors.

U.S. Pat. No. 6,394,856B1 describes a poka-yoke device for a connection assembly with two electrical connectors. The device has two semicylindrical elements. The poka-yoke element located in the fixed connector can be oriented about the connection axis, thereby making it possible to ensure that the mating connector, equipped with the complementary part, will indeed be the intended one. This solution makes it possible to provide an orientable poka-yoke system.

Document EP 1437802A2 also presents a poka-yoke device for a two-part connector, the parts being male and female, each having a tubular portion and being fitted with mutual snap-fastening fixing means.

Document EP 1732180A1 also discloses a poka-yoke device for a connector comprising two sockets which have removable complementary fixing means that can interact only in a single predetermined angular position.

In the avionics field, for safety reasons, it is moreover essential that the electrical connection between the two connectors of one and the same connection assembly is maintained securely and reliably over time.

Lastly, it is clear that the fixed connector must be reliably and dependably fixed to the panel that accommodates it, in order to avoid any detachment and therefore any inadvertent disconnection.

An electrical connection assembly must therefore have the following three functions:

Ensure that the fixed connector and its mating connector are correctly associated, Ensure that the fixed connector is fixed to the panel that accommodates it, Make it possible to lock the connection between the fixed connector and its mating connector.

Presently, there are no solutions which are able to perform all these functions:

Simply, with a minimum number of parts,

With limitation of the number of operations during mounting/dismounting and during maintenance, So as to be reliable operationally and over time, while still remaining perfectly adaptable to various electrical connection solutions.

SUMMARY OF THE INVENTION

This aim is achieved by an improved poka-yoke device for an electrical connection assembly, said connection assembly comprising a first electrical connector, which is provided with a first body and is intended to be fixed to a panel that accommodates it, and a second electrical connector, which is provided with a second body and is intended to be connected to said first connector, said device comprising:

A first part and a second part which can be removably coupled via a mechanical link along a main axis, The first part having a first poka-yoke member and the second part having a second poka-yoke member, The first part having first indexing means for taking multiple distinct orientations about said main axis and positioning said first poka-yoke member in a single first position about said main axis, The second part having second indexing means for taking multiple distinct orientations about said main axis and positioning said second poka-yoke member in a single second position about said main axis, said second position of the second poka-yoke member being chosen so as to allow the second connector to be connected to the first connector, The first part having interlocking securing means for interlockingly securing the first connector to the panel that accommodates it, The second part having first interlocking fixing means that are arranged so as to fix said second part to the second connector, The first part and the second part each have second complementary mechanical fixing means that are intended to interact with one another by interlocking when the first connector and the second connector are coupled, these second complementary fixing means have one or more flexurally deformable tabs, each of which ends with a lug, each tab being made on the first part or the second part, and a slot, made in the second part or the first part, respectively.

According to one particular feature, the first part has a first sleeve having a first lateral wall with a circular cross section, said sleeve being fitted with a first head which has first indexing shapes.

According to another particular feature, the first poka-yoke member is made on the first sleeve and has an elongate shape, which is arranged opposite the first head of the sleeve and forms a continuation of its lateral wall, solely on a first angular portion thereof.

According to another particular feature, the securing means have one or more first elastically flexurally deformable tabs, each of which has a lug and which are made on the lateral wall of the first sleeve, on a second angular portion thereof, separate from said first angular portion.

According to another particular feature, the second part has a second sleeve having a second lateral wall with a circular cross section, said second sleeve being fitted with a second head which has second indexing shapes.

According to another particular feature, the second poka-yoke member is made on the second sleeve and has an elongate shape, which is arranged opposite the second head of the second sleeve and forms a continuation of its lateral wall, solely on a first angular portion thereof.

According to another particular feature, the first interlocking fixing means have one or more second elastically flexurally deformable tabs, each of which has a lug, each tab being made on the second lateral wall of the second sleeve, on a second angular portion thereof, separate from the first angular portion.

According to another particular feature, the securing means have complementary lugs made on the outer face of the first lateral wall of the first sleeve.

According to another particular feature, the first fixing means have complementary lugs made on the outer face of the second lateral wall of the second sleeve.

The invention also relates to an electrical connection assembly comprising a first connector provided with a first body and a second connector provided with a second body, said assembly having a poka-yoke device as defined above, said first part of the device being associated with the first connector and said second part of the device being associated with the second connector.

According to one particular feature, the first body of the first connector is provided with a first through-opening comprising a first spot face defining a first housing.

According to another particular feature, the second body of the second connector is provided with a second through-opening comprising a second spot face defining a second housing.

The invention also relates to a method for mounting an improved poka-yoke device as defined above on the electrical connection assembly as defined above, a mounting phase having the following steps:

Inserting the first part of the device through a first opening made through the first body of the first connector, by choosing an orientation of the poka-yoke member about the main axis by virtue of the indexing means which interact with corresponding indexing means provided on the first body of the first connector, Interlocking the assembly formed from the first part and the first connector in a panel that accommodates the first connector, said panel that accommodates said first connector being held between the first body of the first connector and the securing means of the first part of the device, Inserting the second part of the device through a second opening made through the second body of the second connector, said second part being inserted so as to give the second poka-yoke member an orientation about the main axis that is adapted to the orientation given to the poka-yoke member of the first part of the device, Interlocking the second part through the second body of the second connector, the first fixing means interacting with the second body of said second connector.

During the mounting phase, the second complementary fixing means, having the flexurally deformable tab(s) and the slot, are interlocked by interaction between the lug ending the tab(s) and mechanically lock the coupling between the electrical connectors.

BRIEF DESCRIPTION OF THE FIGURES

Other features and advantages will become apparent from the following detailed description, which is given with reference to the appended figures listed below, in which.

DETAILED DESCRIPTION OF AT LEAST ONE EMBODIMENT

The invention relates to an improved poka-yoke device intended to be associated with an electrical connection assembly.

Figure 1:
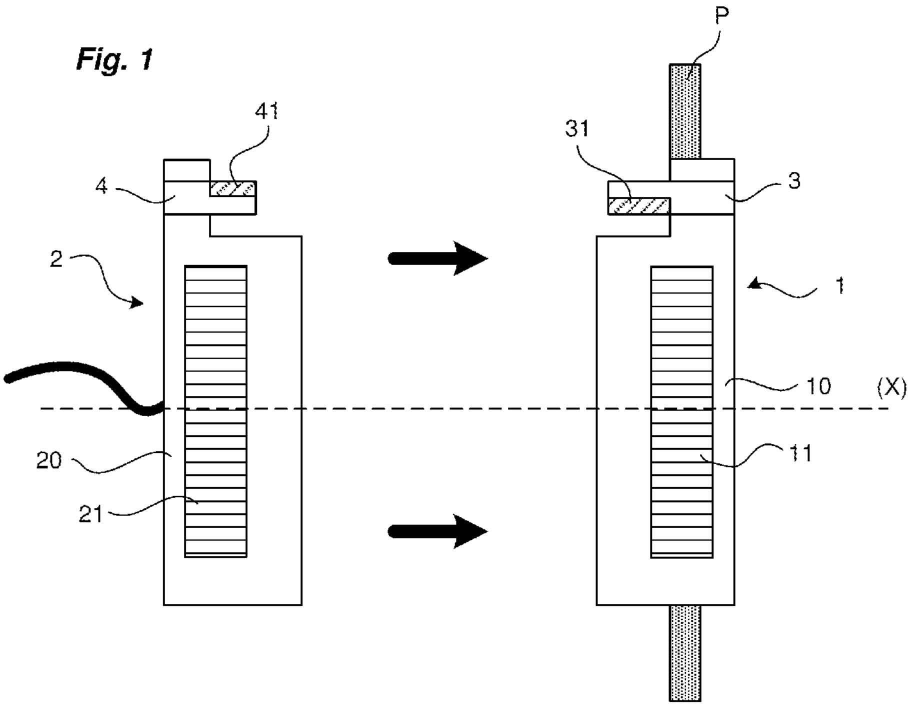
FIG. 1 schematically represents an electrical connection assembly which has a fixed connector mounted on a panel that accommodates it, and shows the improved poka-yoke device according to the invention.

With reference to FIG. 1, the electrical connection assembly conventionally has a first connector referred to as fixed connector 1, intended to be fixed to a panel P that accommodates it, and a second connector, referred to as mating connector 2, intended to be plugged into the fixed connector

1. The two connectors may take any possible outer shape: cylindrical, square, trapezoidal, etc.

For the remainder of the description, a definition is given of an axis (X), referred to as main axis, corresponding to the axis along which the mating connector 2 is inserted into the fixed connector 1 to mechanically couple them and thus produce the electrical connection.

In the remainder of the description, the terms "front" and "rear" are to be understood as meaning along the main axis (X) and taking the connection face of the connector as a reference, this connection face being located at the front for the connector under consideration.

The fixed connector 1 and the mating connector 2 each have an outer body 10, 20 incorporating one or more electrical connection pins 11, 21.

The electrical connection assembly is in particular intended for use in an avionics bay (not represented) and makes it possible to ensure connection of an electrical module. The fixed connector 1 of the electrical connection assembly is intended to be integrated in a panel P that accommodates it or rack of the avionics bay and the movable mating connector 2 is positioned at the end of a ribbon of wires or harness and is plugged into the fixed connector 1.

The invention aims to propose a device which makes it possible to perform the following three functions:

Ensure that the fixed connector 1 and its mating connector 2 are correctly associated, Ensure that the fixed connector 1 is fixed to the panel P that accommodates it, Make it possible to lock the connection between the fixed connector 1 and its mating connector 2.

The device is an improved poka-yoke device. It is made in two parts, referred to as first part 3 and second part 4. Each part 3, 4 is in the form of a single one-piece part. Nonlimitingly, the two parts could be manufactured from a metallic or plastic material. Depending on the material utilized, any manufacturing solution could be envisaged, for example machining or casting.

It should be noted that the poka-yoke function performed by the device must be active before the two connectors 1, 2 are connected in any way. The device must therefore be arranged such that its poka-yoke function prevents the two connectors from being electrically connected if the mating connector presented is not the correct one or if it is presented in an incorrect orientation with respect to the fixed connector.

The first part 3 is associated with the fixed connector 1 and the second part 4 is associated with the mating connector 2. The first part 3 is intended to be fixed to the body 10 of the fixed connector 1 and the second part 4 is intended to be fixed to the body 20 of the mating connector 2.

Figure 2:
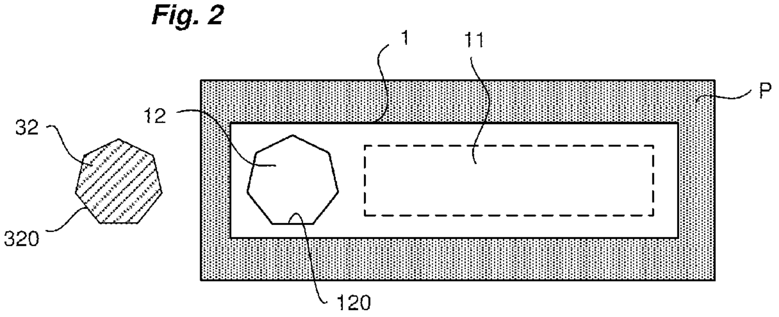
FIG. 2 shows a view from above of the fixed connector integrated in the panel that accommodates it.

With reference to FIG. 2, the body 10 of the fixed connector 1 has a through-opening made along an axis parallel to the main axis (X), which through-opening is provided with a spot face on its rear face, said spot face forming a first housing 12. The first housing 12 has indexing shapes 120.

Figure 3:
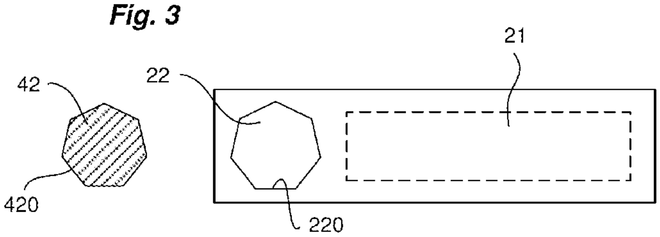
FIG. 3 shows a view from above of the mating connector of the electrical connection assembly.

With reference to FIG. 3, the body 20 of the mating connector 2 also has a through-opening, along an axis parallel to the main axis (X), which through-opening is provided with a spot face on its rear face, said spot face forming a second housing 22. The second housing 22 has indexing shapes 220.

It should be understood that the structural features of the first part of the device and those of the second part may be reversed; what is essential is to provide the functions described above.

The two parts are independent of their respective connector and can be associated with any existing electrical connection assembly to provide it with the three functions listed above.

Nonlimitingly, the first part 3 and the second part 4 of the device each have a cylindrical overall shape in the manner of a sleeve, developed about a first axis A1 and a second axis A2, respectively. Each sleeve 30, 40 has a cylindrical lateral wall that is developed about its respective axis and defines an axial central passage.

The first part 3 has a first poka-yoke member 31 and the second part 4 has a second poka-yoke member 41. The first poka-yoke member 31 and the second poka-yoke member 41 have complementary shapes which interact with one another when the mating connector 2 and the fixed connector 1 are compatible and correctly associated with one another.

Figure 4A:
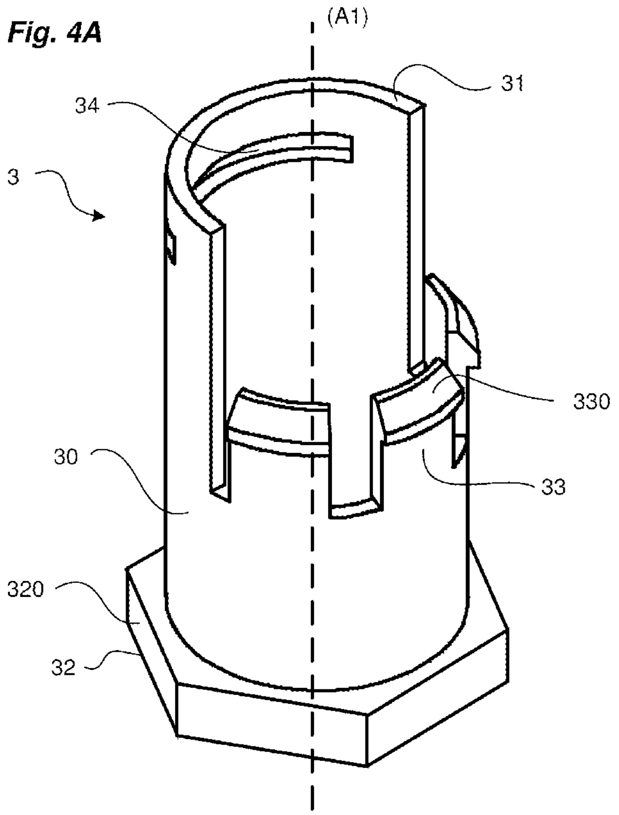
FIG. 4A represents a perspective front view of the first part of the improved poka-yoke device of the invention.
Figure 4B:
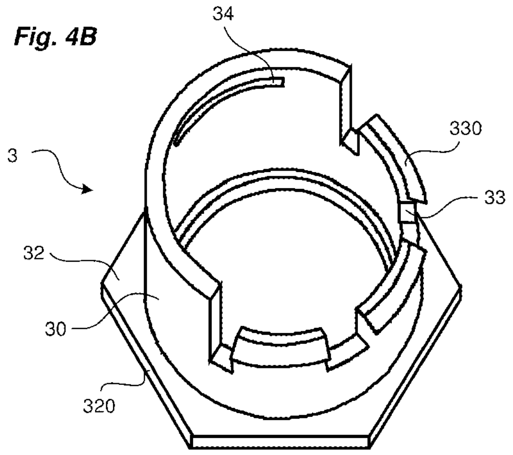
FIG. 4B represents a perspective top view of the first part of the improved poka-yoke device of the invention.

With reference to FIGS. 4A, 4B, the sleeve 30 of the first part 3 has a head 32 provided with indexing shapes or notches 320 allowing it to take various possible orientations about its axis A1 when it interacts with a corresponding housing. In FIG. 2, the head 32 is hexagonal, allowing the first part 3 of the device to take six distinct positions. Any other shape could be envisaged, for example square, octagonal, series of slots, etc. The head 32 of the sleeve 30 is intended to interact with said first housing 12 having complementary indexing shapes 120 and is made at the rear of the body 10 of the fixed connector 1. The positioning of the first part in said first housing makes it possible, by virtue of the complementary indexing shapes, to orient the first poka-yoke member 31 and to give it a single angular position about the axis A1.

Figure 5:
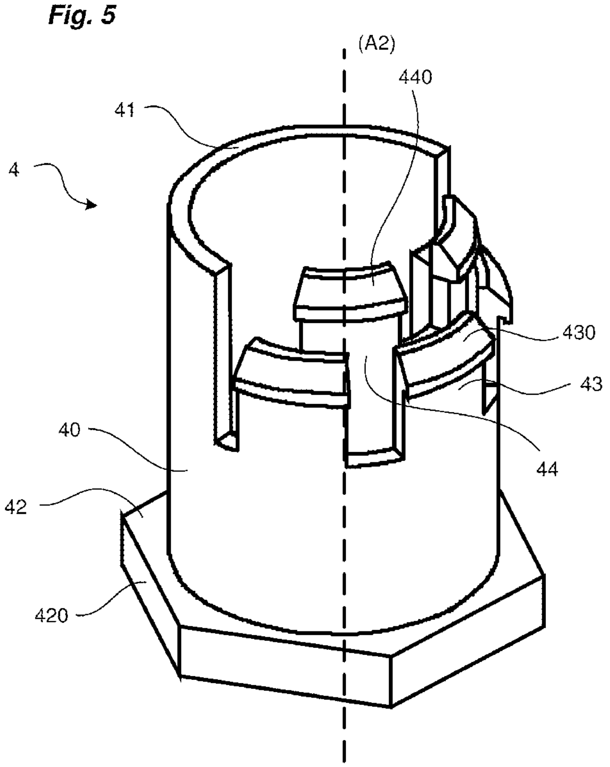
FIG. 5 represents a perspective view of the second part of the improved poka-yoke device of the invention.

With reference to FIG. 5, the sleeve 40 of the second part also has a head 42 likewise provided with indexing shapes or notches 420 allowing it to take various possible orientations about its axis A2 when it interacts with a corresponding housing. In the appended figures, the head 42 is hexagonal, allowing the second part 4 of the device to take six distinct positions. Any other shape could be envisaged, for example square, octagonal, series of slots, etc. The head 42 of the sleeve 40 is intended to interact with the second housing 22 having complementary indexing shapes 220 and is made at the rear of the body 20 of the mating connector 2. The positioning of the second part 4 in said second housing 22, by virtue of the complementary indexing shapes, makes it possible to orient the second poka-yoke member 41 and to give it a single angular position about the axis A2.

Of course, the indexing shapes 320, 420 provided for the first part and the second part are advantageously identical and the two angular positions of the two poka-yoke members 31, 41 are chosen so as to be suitable for allowing the two parts to be coupled when the two connectors are compatible and so that the mating connector 2 is presented in the correct orientation with respect to the fixed connector 1.

Nonlimitingly, the first poka-yoke member 31 and the second poka-yoke member 41 may have an elongate shape with a constant cross section, for example a wall with a semicircular or semicylindrical cross section.

The sleeve 30 of the first part 3 and the sleeve 40 of the second part 4 incorporate two functions. Their wall is divided into two distinct sections, for example each having a semicircular shape.

For the first part 3 of the device, in a first section, which is for example semicircular, the wall of the sleeve 30 is continued so as to form the first poka-yoke member 31 which stands out opposite its head 32. In a second section, which is for example semicircular, at the top of the wall, opposite its head, the wall of the sleeve 30 has one or more tabs 33 each bearing a lug 330. The appended figures depict three lugs 330 forming a first row. The lugs 330 are oriented outwardly and are intended to bear against the front face of the panel P that accommodates the fixed connector 1. The panel P that accommodates said fixed connector is then held between the head 32 and the lugs 330 of the first part 3 of the device. Of course, the distance between the head and the lugs is adapted to the thickness of the assembly composed of the body 10 of the fixed connector 1 and the panel P at this location.

For the second part 4 of the device, in a first section, which is for example semicircular, the wall of the sleeve 40 is continued so as to form the second poka-yoke member 41 which stands out opposite its head 42. In the second section, which is for example semicircular, at the top of the wall, opposite its head 42, the wall of the sleeve 40 has one or more tabs 43 each bearing a lug 430. The appended figures depict three lugs 430 forming a first row. The lugs 430 are oriented outwardly and are intended to bear against the front face of the mating connector 2 so as to secure the second part 4 to the body 20 of the connector 2. Of course, the distance between the head 42 and the lugs 430 is adapted to the thickness of the body of the mating connector at this location.

The first part 3 of the device thus has means for securing the fixed connector 1 to the panel P that accommodates it, these securing means working by interlocking, or in other words by clipping.

For its part, the second part 4 of the device has interlocking, in other words clipping, fixing means arranged so as to allow it to be fixed to the body 20 of the mating connector 2.

The first part 3 and the second part 4 of the device also each have complementary fixing means making it possible to associate them with one another to produce a stable mechanical link and thus ensure that the electrical connection between the two connectors 1, 2 is maintained and locked.

Figure 8:
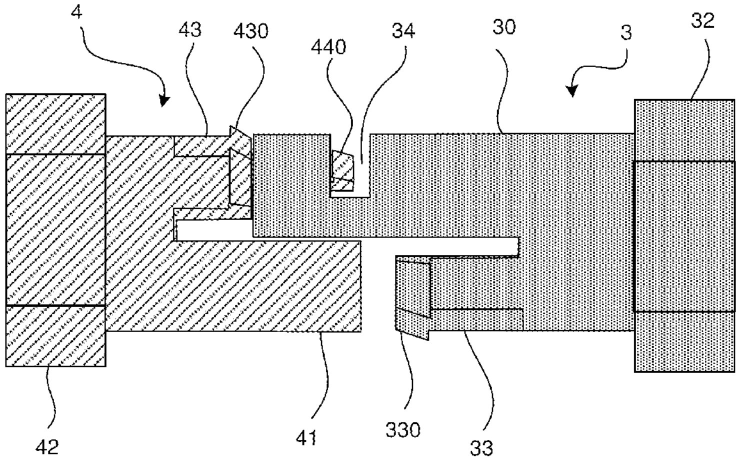
FIG. 8 illustrates the principle of mechanical coupling and locking between the two parts of the improved poka-yoke device according to the invention.

Nonlimitingly, these fixing means are in the form of one or more tabs 44 arranged on the second part 4, each of which is fitted with an end lug 440 standing out at the top of a wall arranged inside the sleeve and culminating above the first row of lugs 430 dedicated to fixing the second part 4 to its connector 2. On the side of the first part 3, a complementary slot 34 or groove is made through the wall forming the poka-yoke member 31, this slot 34 being intended to receive said lugs 440 of the second part so as to interlock the second part in the first part. Of course, while still keeping the interlocking principle, it is possible to swap the slot and the lugs between the first part and the second part of the device. FIG. 8 illustrates the principle of interlocking between the two parts of the device to lock the connection.

It should be noted that the tabs 33, 43, 44 that are made on the first part 3 and on the second part 4 are designed, of course, to elastically flexurally deform about their base, in order to pivot sufficiently while being mounted by interlocking or while being dismounted and so as to return to an initial state after flexure.

Figure 6:
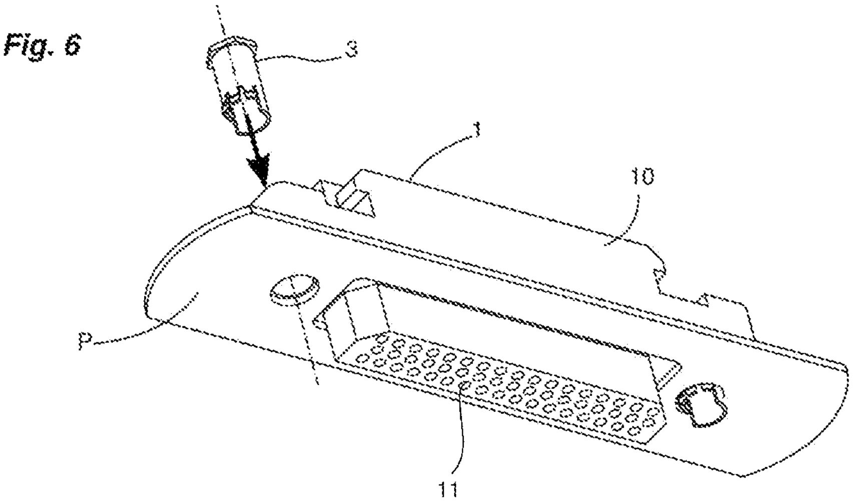
FIG. 6 illustrates the installation of the first part of the device of the invention on the body of a fixed connector integrated in the panel that accommodates it.
Figure 7:
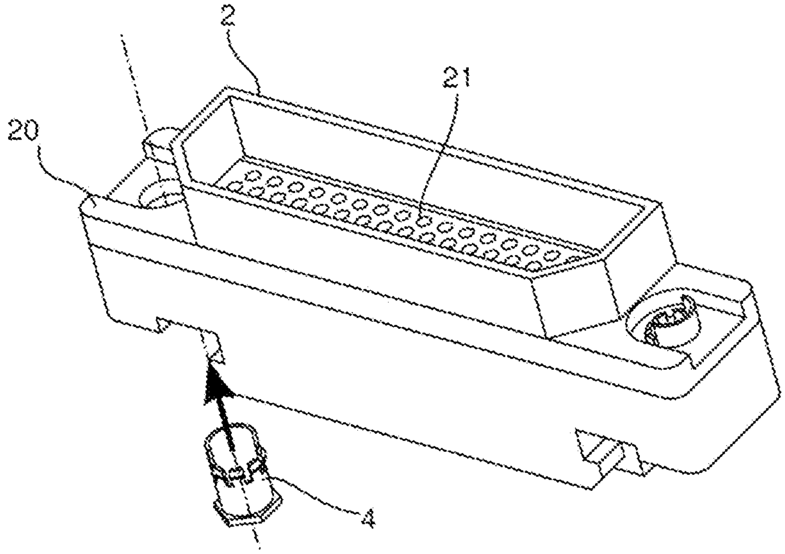
FIG. 7 illustrates the installation of the second part of the device of the invention on the body of a mating connector.

With reference to FIGS. 6 to 8, the operating principle is thus as follows:

Step 1: The first part 3 of the device is associated with the fixed connector 1. It is inserted via the rear of the body 10 of the fixed connector 1, through the opening made through the body of the connector along its axis A1, oriented parallel to the main axis (X), its head 32 becoming housed in abutment in the first complementary housing 12, by choosing a first orientation about the main axis (X), by virtue of the indexing shapes 320 of its head and those of the corresponding housing.

Step 2: The first part 3 is pressed in the first housing as far as its head 32, the complementary indexing shapes interacting with one another to prevent rotation about the axis.

Step 3: By maintaining this orientation, the first part 3 of the device is engaged by way of its end that is opposite its head in a corresponding orifice in the panel P that accommodates the first connector, until it is interlocked with the panel, the panel P becoming held between the body 10 of the connector 1 and the lugs 330 of the first part of the device.

Step 4: The second part 4 of the device is inserted via the rear of the body 20 of the mating connector 2, its axis A2 being oriented parallel to the main axis (X), until its head 42 is pressed in the second housing 22. The engagement is produced by orienting the second part 4 about the main axis (X) in an adapted manner so as to correspond to the orientation given to the first part 3 of the device and to perform the poka-yoke function.

Step 5: by maintaining the chosen orientation, the second part 4 is pushed through the body of the connector until its lugs 430 and the body 20 of the connector interlock.

Step 6: During operation (FIG. 8), when the mating connector 2 is moved toward the fixed connector 1 in the correct orientation, the poka-yoke device allows the coupling to take place. When the connectors are coupled, the second part 4 of the device becomes interlocked in the first part 3 by interaction between the lugs 440 and the slot 34, thus making it possible to mechanically lock the coupling and therefore the electrical connection.

Nonlimitingly, use may be made of multiple improved poka-yoke devices according to the invention for one and the same electrical connection assembly.

When multiple identical connection assemblies are arranged on one and the same panel, at least one distinct improved poka-yoke device may be associated with each electrical connection assembly, the poka-yoke devices each having different configurations, with various indexing systems for giving their poka-yoke member different orientations, thus avoiding any connection errors.

In a variant embodiment, it is also possible, in the first part and/or the second part of the device, to provide complementary fixing members, which complete their first row of tabs+lugs. This may, for example, involve a bead or lugs made on the outer face of the wall of the sleeve.

The dismounting of the device is also easy. It can be implemented by introducing a tube along the axis A1 into the first part 3, in order to withdraw the lugs 440 of the second part 4 and to move them out of the slot 34.

Of course, it should be understood that the dimensional characteristics (length, diameter) and shape characteristics of the two parts of the device may be adapted and that other geometries can be envisaged.

Similarly, the material utilized for the two parts is chosen depending on the mechanical characteristics sought for the application. Any material having properties that are in line with the surroundings of the connector (temperature, pressure) and the compatibility constraints of this material (resistance to fluids, galvanic couple) may be used to produce each of the two parts of the device.

The solution of the invention thus has numerous advantages, including:

It makes it possible to perform the poka-yoke function for the purpose of safeguarding the association between two connectors of one and the same connection assembly;

It makes it possible to ensure that the fixed connector is fixed to the panel that accommodates it by simple interlocking, thus without use of a tool and thus without applying a tightening torque;

It makes it possible to lock the connection between the fixed connector and its mating connector, by simple interlocking, thus also without use of a specific tool and without applying a tightening torque.

The invention claimed is:

1. A fool-proof device for an electrical connection assembly, said connection assembly comprising a first electrical connector (1) having a first body (10) and is intended to be fixed to a panel (P) that accommodates it, and a second electrical connector (2) having a second body (20) and is intended to be connected to said first connector (1), said device comprising:

a first part (3) and a second part (4) which can be removably coupled via a mechanical link along a main axis (X), the first part (3) having a first fool-proof (31) and the second part (4) having a second fool-proof member (41), the first part (3) having a first indexing device for taking multiple distinct orientations about said main axis (X) and positioning said first fool-proof member in a single first position about said main axis (X), the second part having a second indexing device for taking multiple distinct orientations about said main axis and positioning said second fool-proof member in a single second position about said main axis (X), said second position of the second fool-proof member being chosen so as to allow the second connector to be connected to the first connector, the first part (3) having an interlocking securing device for interlockingly securing the first connector (1) to the panel (P) that accommodates it, and the second part (4) having a first interlocking fixing device that are arranged so as to fix said second part (4) to the second connector (2), Characterized in that:

the first part (3) and the second part (4) each have a second complementary mechanical fixing devices that are intended to interact with one another by interlocking when the first connector (1) and the second connector (2) are coupled, the second complementary fixing device having a slot (34) and one or more flexurally deformable tabs (44), each of which ends with a lug (440) and stands out at the top of a wall arranged inside the first fixing device (43) for fixing the second part (4) to its connector (2) while still culminating them, each tab being made on the first part (3) or the second part (4) and the slot (34) being made on the second part (4) or the first part (3), respectively.

2. The device as claimed in claim 1, wherein the first part (3) has a first sleeve (30) having a first lateral wall with a circular cross section, said sleeve being fitted with a first head (32) which has first indexing shapes (320).

3. The device as claimed in claim 2, wherein the first fool-proof member (31) is made on the first sleeve and has an elongate shape, which is arranged opposite the first head (32) of the sleeve and forms a continuation of its lateral wall, solely on a first angular portion thereof.

4. The device as claimed in claim 3, wherein the securing device has one or more first elastically flexurally deformable tabs (33), each of which has a lug (330) and which are made on the lateral wall of the first sleeve (30), on a second angular portion thereof, separate from said first angular portion.

5. The device as claimed in claim 4, wherein the securing device have complementary lugs made on the outer face of the first lateral wall of the first sleeve.

6. The device as claimed in claim 2, wherein the second part (4) has a second sleeve (40) having a second lateral wall with a circular cross section, said second sleeve (40) being fitted with a second head (42) which has second indexing shapes (420).

7. The device as claimed in claim 6, wherein the second fool-proof member (41) is made on the second sleeve (40) and has an elongate shape, which is arranged opposite the second head (42) of the second sleeve and forms a continuation of its lateral wall, solely on a first angular portion thereof.

8. The device as claimed in claim 7, wherein the first interlocking fixing device has one or more second elastically flexurally deformable tabs (43), each of which has a lug (430), each tab being made on the second lateral wall of the second sleeve, on a second angular portion thereof, separate from the first angular portion.

9. The device as claimed in claim 8, wherein the first interlocking fixing device has complementary lugs made on the outer face of the second lateral wall of the second sleeve.

10. An electrical connection assembly comprising:

a first connector (1) provided with a first body (10), a second connector (2) provided with a second body (20), and a fool-proof device as defined in claim 1, said first part (3) of the device being associated with the first connector (1) and said second part (4) of the device being associated with the second connector (2).

11. The connection assembly as claimed in claim 10, wherein the first body of the first connector is provided with a first through-opening comprising a first spot face defining a first housing (12).

12. The connection assembly as claimed in claim 10, wherein the second body of the second connector is provided with a second through-opening comprising a second spot face defining a second housing (22).

13. A method for mounting an improved fool-proof device as defined in claim 1 on an electrical connection assembly including a first connector (1) provided with a first body (10), a second connector (2) provided with a second body (20), and a fool-proof device as defined in claim 1, said first part (3) of the device being associated with the first connector (1) and said second part (4) of the device being associated with the second connector, a mounting phase having the following steps:

inserting the first part (3) of the device through a first opening made through the first body (10) of the first connector (1), by choosing an orientation of the fool-proof member (31) about the main axis (X) by virtue of the indexing device which interact with corresponding indexing device provided on the first body (10) of the first connector (1), interlocking the assembly formed from the first part (3) and the first connector (1) in a panel (P) that accommodates the first connector (1), said panel (P) that accommodates said first connector being held between the first body (10) of the first connector (1) and the securing device of the first part (3) of the device, inserting the second part (4) of the device through a second opening made through the second body (20) of the second connector, said second part (4) being inserted so as to give the second fool-proof member (41) an orientation about the main axis (X) that is adapted to the orientation given to the fool-proof member (31) of the first part (3) of the device, interlocking the second part (4) through the second body (20) of the second connector (2), the first fixing device interacting with the second body (20) of said second connector (2), the second complementary fixing device having the flexurally deformable tab(s) (44) and the slot (34), and are interlocked by interaction between the lug (440) ending the tab(s) (44) and mechanically lock the coupling between the electrical connectors.

* * * * *